United States Patent [19]

Coulombe

[11] 4,226,401

[45] Oct. 7, 1980

[54] HYDRAULIC FLOOR JACK

[76] Inventor: Firmin Coulombe, P.O. Box 142, Grosses-Roches, Cté Matane, Quebec, Canada G0J 1K0

[21] Appl. No.: 83,403

[22] Filed: Oct. 10, 1979

[51] Int. Cl.³ .................... B60P 1/00

[52] U.S. Cl. .................... 254/2 B; 254/93 R; 254/1; 254/DIG. 1

[58] Field of Search .................... 254/2 R, 2 B, 2 C, 3 R, 254/3 B, 3 C, 93 H, 93 R, 134, 1, DIG. 1

[56] References Cited

U.S. PATENT DOCUMENTS

| | | | |
|---|---|---|---|
| 1,955,635 | 4/1934 | Kelly | 254/2 B |
| 2,671,636 | 3/1954 | Olson | 254/1 |
| 3,595,525 | 7/1971 | Yaste | 254/2 B |
| 3,606,246 | 9/1971 | Harrah | 254/2 B |

*Primary Examiner*—Robert C. Watson

[57] ABSTRACT

An hydraulic floor jack of the type which rolls on the floor to engage under a vehicle to lift it. This jack is characterized by an articulated frame to operatively and selectively use less floor space, flexible tire wheels to allow the load on the jack to be transmitted directly to the floor by the base of the jack upon flexing of the flexible tires under the load until the best rests on the floor, and by a narrow construction and arrangement of the operative parts to allow engagement in narrow spaces and in particular between the tandem wheels of a truck.

6 Claims, 4 Drawing Figures

HYDRAULIC FLOOR JACK

This invention relates to an hydraulic floor jack of the type which rolls on the floor to engage under a vehicle and lift it.

The existing jacks of the above type have so far been made with a rigid frame and solid wheels resulting in a construction of fixed and substantial length which is cumbersome to use in many places where there is limited floor space to maneuver. Besides, with the solid wheels, the full load must be carried by the wheels and the axles thereof. This requires a solid and heavy construction which does not allow or is not conducive to a narrow shape or form to engage in narrow spaces such as between a set of fore and aft wheels of a tandem wheel and axle assembly of a truck.

It is a general object of the present invention to provide an hydraulic floor jack of the above type which avoids the above mentioned disadvantages.

It is a more specific object of the present invention to provide an hydraulic floor jack of the above type which is articulated to allow maneuvering in limited floor space and to operatively occupy very little floor space of its own beside the floor space occupied by the vehicle under which it is used.

It is another object of the present invention to provide an hydraulic floor jack of the above type which is constructed and arranged to produce a narrow form engageable in narrow spaces such as between the aforementioned wheels of a vehicle.

It is a further object of the present invention to provide an hydraulic floor jack of the above type which is of lighter and relatively less expensive construction.

It is a more specific further object of the present invention to provide an hydraulic floor jack of the above type which is constructed to transmit the load thereon directly from the base of the hydraulic cylinder to the floor independently of the wheels and to thereby achieve a lighter construction.

It is still another object of the present invention to provide an hydraulic floor jack which includes articulated sections to minimize the encumbrance thereof and which allows actuation of the jack in any predetermined articulated position.

The above and other objects and advantages of the present invention will be better understood with reference to the following detailed description of a preferred embodiment thereof which is illustrated, by way of example, in the accompanying drawings, in which.

Figure 1:
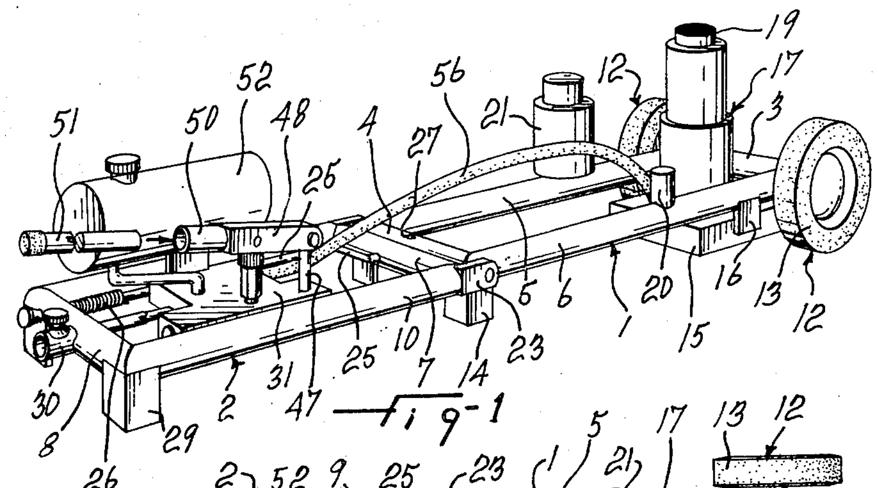
FIG. 1 is a perspective view of an hydraulic floor jack according to the present invention.
Figure 2:
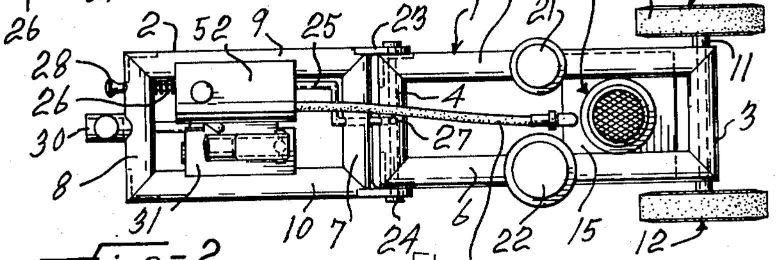
FIG. 2 is a top view of the jack of FIG. 1.

The illustrated hydraulic floor jack comprises a frame formed of a front frame section 1 and a rear frame section 2, each of narrow rectangular frame structure, as can be seen in FIGS. 1 and 2. The frame structure of the front section 1 includes transverse ends 3 and 4 joined to longitudinal sides 5 and 6. Similarly, the frame structure of the rear section 2 includes transverse ends 7 and 8 and longitudinal sides 9 and 10.

A wheel axle 11 extends through the tubular side 3 of the front section 1 and rotatively carries a pair of wheels 12 on its outwardly projecting ends. As shown, each wheel 12 is provided with an inflatable tire 13 or otherwise flexible tires. A pair of feet 14 are fixedly secured as by welding to the same end of the front frame section 1 as the transverse end 4 to carry the frame structure of this section off the floor cooperatively with the wheels 12.

A solid base 15 is fixedly secured by lugs 16 to downwardly project a predetermined and limited height from the floor such as to allow this base to rest on the ground upon flexing of the tires 1*e* upon loading on the jack. The base 15 registers with the rectangular opening defined by the frame structure 3, 4, 5 and 6 and at the end thereof adjacent the flexible tire wheels 12. An hydraulic cylinder 17 is secured upright on the base 15 and has an internal piston 18 having an outer projecting head 19 of smaller diameter than the remainder of the piston to form an upward male projection. A pair of studs 20 upwardly project from the longitudinal sides 5 and 6 respectively. A pair of extensions 21 and 22 are engaged over each stud 20 by engagement of the latter in a corresponding female bottom portion of the extensions. The latter are adapted to fit over the upper male head 19 of the jack piston to provide an extension to the latter.

The rear frame section 12 is provided with a pair of lugs 23 which are pivoted by a transverse pivot pin 24 to the frame structure of the front section 1. The pin 24 extends inside the tubular transverse end 4.

Figure 3:
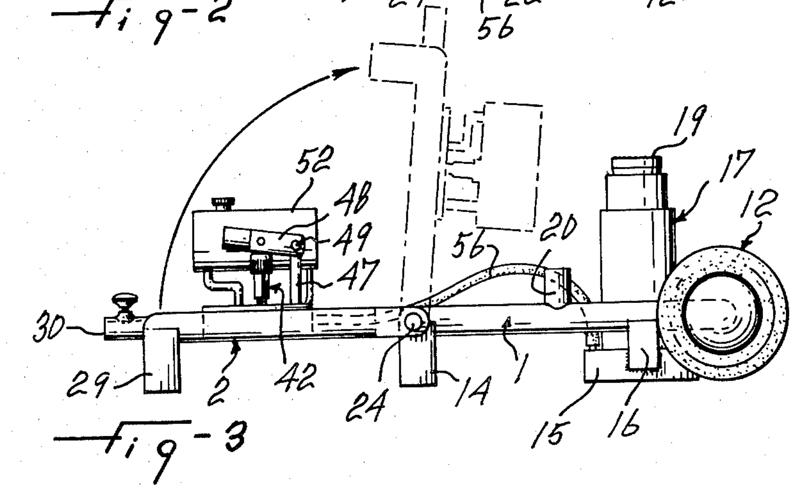
FIG. 3 is a side view of the same jack showing in dotted lines a rear frame section in fully elevated position, angularly relative to the front frame section.

A locking rod 25 is slidable endwise in the transverse ends 7 and 8 and is biased by a spring 26 forwardly toward the front frame section. The forward end of the locking rod 25 operatively projects forward from the transverse end 7 to operatively engage into one of a plurality of holes 27 angularly positioned around the transverse end 4. For instance, in this case, there are 3 into the transverse end 4 angularly arranged at predetermined angles to lock the rear frame section 2 at say 0, 45 or 100 degrees of angular elevation relative to the front frame section. For instance, the 0 degree position is shown in full lines and the 100 degree position is shown in dotted lines in FIG. 3. The outer end of the locking rod 25 is provided with a pull knob 28 to selectively unlock the rod by pulling thereon against the bias of the spring 26 until the front end thereof disengages the hole 27 in which it was.

A pair of legs 29 are fixedly secured to the outer end of the rear frame section 2 to support the same generally level with the front frame section 1. A handle socket 30 outwardly projects and opens from the transverse end 8 in registry with a bore diametrically through this transverse end 8.

Figure 4:
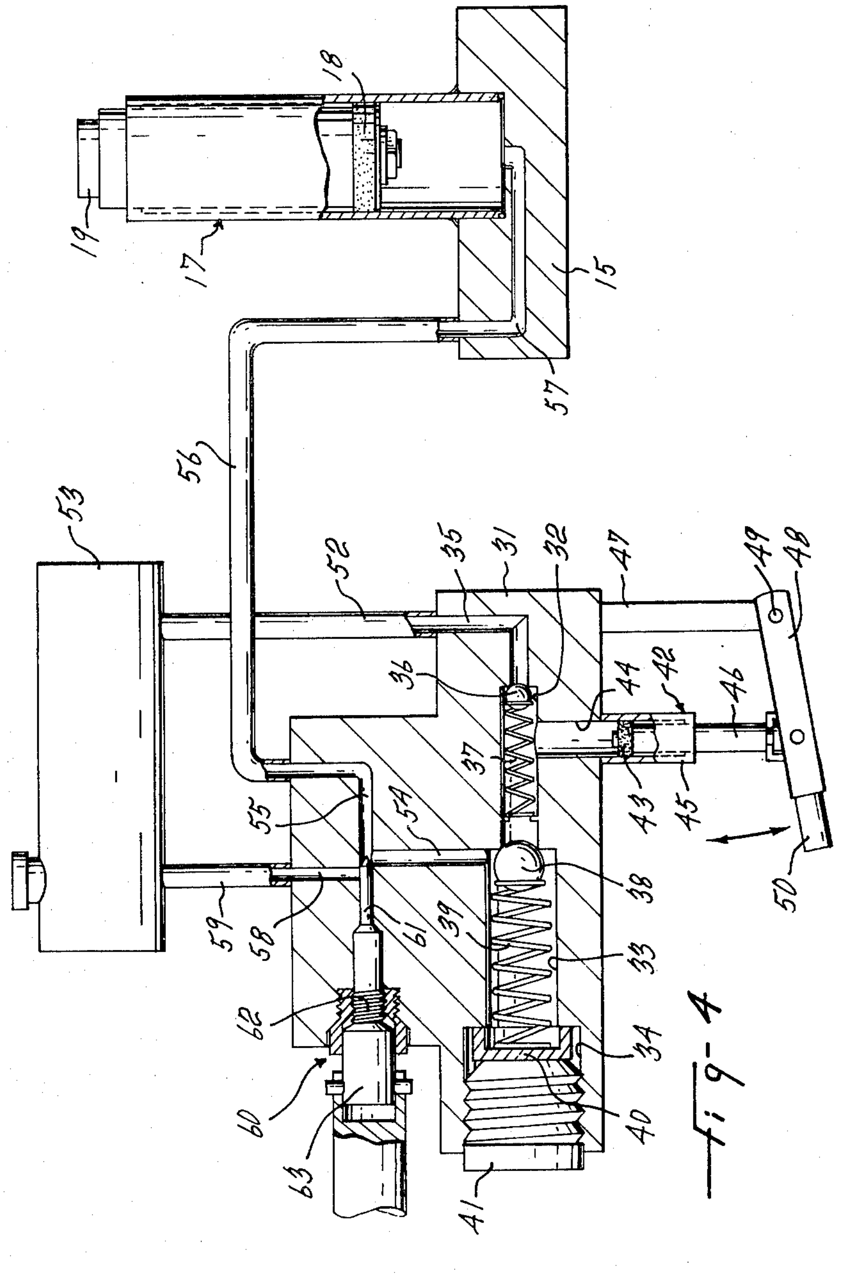
FIG. 4 is a diagrammatic view of the hydraulic circuit and a detailed view of the associated elements.

A valve unit 31, shown in details in FIG. 4, is fixedly secured to the rear frame structure between the longitudinal sides 9 and 10 thereof. The valve unit 31 is provided with a twice counterbored aperture therein defining a smaller diameter cylindrical chamber 32, a larger diameter cylindrical chamber 33, and a still larger outer chamber 34. These chambers serially communicate with each other and with an inlet passage 35 at the end of the smaller chamber 32. A ball 36 is axially biased by a spring 37 to close the inlet passage 35. A ball 38 is axially biased by a spring 39 to close the passage between the chambers 32 and 33. The outer end of the spring 39 is seated in a movable cup 40 which is held in place by a threaded plug or cap 41. This arrangement produces a cascaded check valve adapted to be operated by a pump 42. The latter includes a piston 43 axially displaceable in a bore 44 radially communicating with the smaller cylindrical chamber 32. A cylindrical cap 45 forms an axial extension of the hydraulic cylinder bore. A piston rod 46 is secured to the piston 43 and outwardly projects from the cap 45. A post 47 is fixed to the valve unit 31. A pump actuator arm 48 is pivoted at one end on the post 47 through a pivot 49 and is provided at the other end with a handle socket 50 to receive one end of a handle 51.

The inlet passage 35 is connected by a pipe or tube 52 to an hydraulic fluid reservoir 53 also mounted on the rear frame section 2. An outlet passage 54 at one end communicates with the larger cylindrical chamber 33 and at the other end radially communicates with a high pressure fluid passage 55 connected by a tube or hose 56 to the hydraulic cylinder 17 through a passage 57 in the base 15. A pressure release passage 58 communicates at one end with the high pressure fluid passage 55 in offset position relative to the flow path between the outlet passage 54 and the hydraulic cylinder 17. A pipe 59 connects the pressure release passage 58 to the reservoir 53.

A pressure release valve 60 is operatively connected to the passage 55 and includes a needle 61 adapted to axially move in this passage and close the pressure release passage 58. The needle 61 is provided on the inner end of a member having an intermediate threaded portion 62 and an outer socket end portion 63. This valve is opened or closed by appropriate rotation of the socket portion 63 by the handle 51 which must be engaged in the handle socket 30 for that purpose. Upon rotation, the threaded portion cause axial displacement of the needle 61 to either open or close the pressure release passage 58. When this valve is opened, the hydraulic fluid pressure if any in the cylinder is released into the reservoir 53 through the conduits 57, 56, 55, 58 and 59.

When the valve is closed, the pumping by engagement of the handle 51 in the handle socket 50 produces hydraulic fluid to be sucked in the chamber 32 and thereafter expelled into the larger chamber 33 and the outlet passge 54 toward the hydraulic cylinder 17 for each suction and expulsion stroke of the piston 43. Thus, the pressure may be built up to lift a vehicle engaged by the piston head 19.

It must be noted that the locking rod 25 allows to secure the rear frame section 2 in any predetermined position such as to be able to operate the pump 42 and the pressure release valve 60 in any elevated position of the rear section.

What I claim is:

1. A hydraulic floor jack comprising an articulated frame including a front and a rear frame sections hinged one to the other, flexible tire wheel means attached to the front frame section and rollably supporting the same, a locking device connected to said frame and operatively locking the rear frame section in selected angular elevation relative to the front frame section, a rigid base fixed to said front frame section adjacent said flexible tire wheel means, and depending therefrom at a predetermined limited height for engagement with the ground upon flexing of any tire of the flexible tire wheel, an hydraulic cylinder secured upright on said base, an hydraulic fluid supply mounted on the frame, and a pump secured to the rear frame section, connected to the hydraulic fluid supply and to the hydraulic cylinder and selectively supplying hydraulic fluid under pressure to the hydraulic cylinder upon selective actuation thereof.

2. A hydraulic floor jack as defined in claim 1, wherein said front and said rear frame sections are elongated and hinged end to end one to the other pivotally about a transverse pivot axis, and a handle operatively engages said pump longitudinally of the elongated frame sections and is operable in either angular position of the rear frame section relative to the front frame section.

3. A hydraulic floor jack as defined in claim 2, wherein said locking device includes a spring biased rod operatively engageable into one of a plurality of angularly spaced apart holes in the front frame section and secured to the rear frame section for endwise displacement longitudinally of the latter and unlocking upon said displacement.

4. A hydraulic floor jack as defined in claim 1, 2 or 3, wherein each of the front and rear frame sections includes a rectangular frame structure defining an enclosed central space, said base is fixedly secured to the rectangular frame of the front frame section at the front of the enclosed central space thereof, and said pump includes a valve unit fixedly secured to the rectangular frame structure of the rear frame section.

5. A hydraulic floor jack as defined in claim 1, 2 or 3, further including said hydraulic cylinder having an upwardly projecting outer piston head, studs upwardly projecting from the front frame section, and auxiliary jack extensions having a female end resting over said studs and operatively engaging over said upwardly projecting outer piston head and providing selective extension of the operative height of the hydraulic cylinder.

6. A hydraulic floor jack as defined in claim 2, or 3, wherein a handle socket is fixedly secured to said rear frame section and accommodates said handle for maneuvering of the jack, said pump includes a valve unit having a pressure release valve communicating with the hydraulic cylinder and connected to said handle socket whereby said pressure release valve is actuated by said handle upon engagement of the latter in the handle socket.

* * * * *